March 11, 1958     L. C. SACKETT     2,826,706
ENGINE ANALYZER SYSTEM AND PICK-UP THEREFOR
Filed Sept. 13, 1954
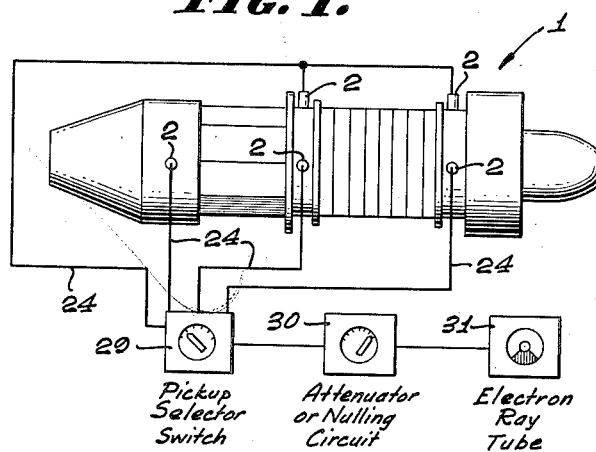
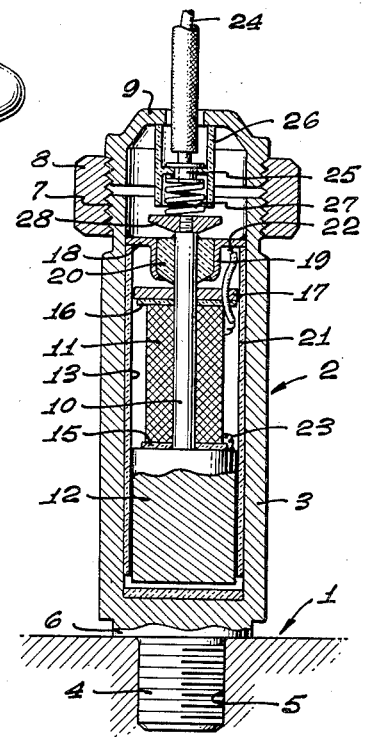
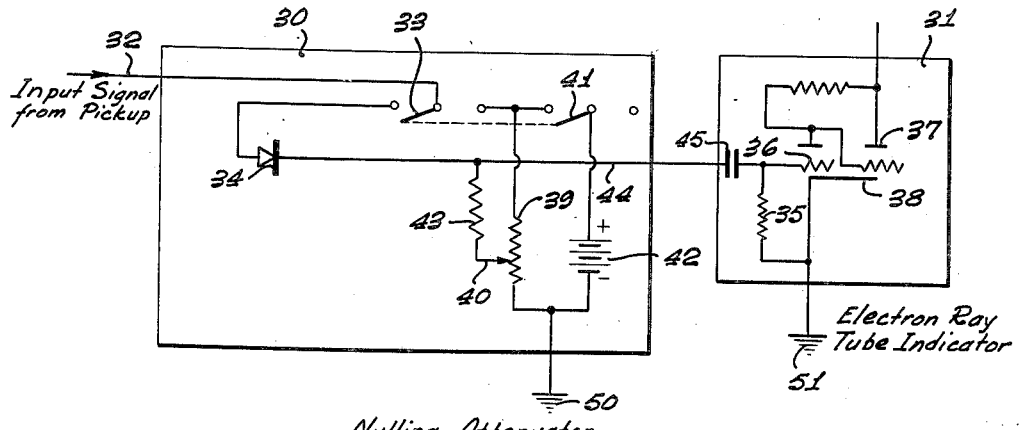
INVENTOR.
LOREN C. SACKETT
BY
Flam and Flam
ATTORNEYS.

United States Patent Office 2,826,706
Patented Mar. 11, 1958

2,826,706

ENGINE ANALYZER SYSTEM AND PICK-UP THEREFOR

Loren Clifford Sackett, Inglewood, Calif., assignor to Brooks Walker, San Francisco, Calif.

Application September 13, 1954, Serial No. 455,386

7 Claims. (Cl. 310—26)

This invention relates to a system for detecting and analyzing incipient failures and malfunctions in aircraft engines, either of the reciprocating type or of the jet type. It is designed as a system which may be permanently installed, but not necessarily so, on the aircraft and to give adequate warning of pending difficulties at all times, both pre-flight and during flight. Specifically, this invention relates to the detection and indication of excessive and abnormal vibrations of power plants such as jet aircraft engines operating under normal in-flight conditions.

Upon the reliable operation of a jet aircraft engine is dependent the safety of the engine itself, the aircraft powered by the engine, the auxiliary equipment on the aircraft, not to mention the personnel flying in the aircraft. It can be realized therefore, that it is exceedingly important to take any necessary means available for the purpose of preventing the failure of a jet aircraft engine. One means by which this can be done is to devise a system which detects those abnormal effects that foretells a possibility of failure sufficiently in advance of the failure so that proper and immediate preventative and corrective action can be taken.

It is common knowledge in the aircraft industry that any excessive or abnormal vibration of a jet aircraft engine is a highly probable indication of incipient engine failure. For example, in a turbo-jet engine, the turbines rotate at extremely high rates and the slightest unbalance causes a concentration of stress not necessarily at the point of unbalance which progressively causes weakening of the structure, leading eventually to failure of the engine. This type of malfunction is always accompanied by excessive vibrations. Further, the bearings of a turbo-jet engine are subjected to terrific forces and when they are operating properly, there is little or no vibration, but as the bearings wear, their operation becomes rough and abnormal vibration becomes evident. Even the presence or absence of combustion in the different chambers of a jet engine is evidenced by the presence and nature of vibrations in the vicinity of these chambers. One could go on enumerating many other examples of how excessive or abnormal vibrations of the various component parts of jet aircraft engines is a positive indication of future failure or definite malfunction.

It is therefore an object of this invention to provide a system capable of being permanently installed on a jet aircraft engine, which will constantly monitor the vibrations produced at selected locations on the engine, transmitting this information by means of conductors to an indicator or alarm situated in front of a responsible observer, so that in the event of any excessive or abnormal vibrations, corrective and preventative action can be taken by the involved personnel.

It is another object of this invention to provide a system that is light in weight, occupies a minimum of space, and is relatively inexpensive to install, since all these factors are of prime importance in modern aircraft, already overloaded with auxiliary equipment, and where the addition of every extra pound of volume detracts from the range and cargo handling capabilities.

Weight saving is accomplished by:

(1) The use of a self generating vibration pickup which is small and light per se, and that requires no auxiliary equipment for the excitation purposes.

(2) The use of a vibration pickup with a high electrical output and low internal impedance which allows the use of light weight single conductor unshielded cable for transmitting the vibration information to the indicator, and which output because of its large value, does not require additional electrical equipment in the form of amplifiers to actuate the indicator or alarm. As a matter of fact, the biggest weight saving is in the vibration harness.

In some contemporary systems, shielded harness is used, wherein the weight of the complete vibration system for a B-36 aircraft is approximately 350 pounds. Of this weight over 200 pounds is shielded harness alone; that is, roughly 35 pounds per engine.

The low impedance, high output of the present invention permits hooking of pickups in combination, thereby saving on wiring weight. Also, because of the low impedance, high output characteristics of the pickup, the existing thermocouple harness of an engine could be utilized to transmit the electrical vibration information.

The high output of the pickup is due to several factors, one of which is that it does not respond strongly to those high frequencies which contribute only noise; instead, its natural frequency is low, and is close to the band of frequencies generated by the jet engine.

Another object of this invention is to provide a system that has as its sensing member a vibration pickup operating on magnetic principles, but without paramagnetic material for the magnetic return path. As will be shown later in this specification, several advantages occur from this innovation.

It is another further object of this invention to provide a system that is rugged, will withstand the extremes of vibration, will operate under the temperature extremes generated by the jet engine, and is impervious to malfunction due to corrosion, atmospheric and humidity effects. This object is accomplished by the use of:

(1) A vibration pickup, the sensing portion of which requires little or no displacements to generate an electrical output, since large displacement type pickups become fatigued after continued use, leading subsequently to a high probability of pickup failure. The pickup of this invention utilizes a magneto-strictive sensing element where physical displacements of the elements are measured in millionths of an inch, or less.

(2) Conductor lead wire and vibration pickup that is constructed of superior temperature resistant materials that allow the system to operate continuously in ambient temperatures in excess of 400° Fahrenheit. This involves the use of silver brazing, and insulations of the Teflon and fiber-glass types.

(3) Plated brass housing for the pickup in which the entire sensing element is hermetically sealed, and by vacuum impregnation of the inside conductors.

A still further object of this invention is to provide a system that will indicate without ambiguity the nature and approximation location of any malfunction of the jet engine by the use of:

(1) A vibration pickup with high directional response which is accomplished by design such that the sensing element has only one, or at least a singularly preferred degree of freedom.

(2) Multiplicity of pickups strategically located on the jet engine so that in combination with selective switching, or continuous monitoring of the response of all pickups, a competent person can make a diagnosis.

(3) In addiiton, the pickup can be used with a probe in such a manner that the device is portable in nature allowing one to search out malfunction much as a doctor uses a stethoscope.

And an even still further object of this invention is to provide a system that gives a reproducible output under repeated identical conditions, even when replacement parts are used. This object is accomplished by:

(1) The use of a vibration pickup, the manufacture of which does not require close mechanical tolerances, for the purposes of electrical behavior; the pickup has no critical airgaps, no critical pressure bias is required, and since the seismic mass of the pickup is allowed a relatively great freedom of motion, there is no problem of adjusting the damping. The output of such a device is thus little affected by changes in temperature and other environmental conditions.

(2) The use of a null type of indicator, less subject to variability than any other type, an example of which is the so-called electron ray tube type of indicator, although it is obvious that many types of indicators can be used.

And yet another object is to use a housing shape and configuration for the pickup which allows the use of open, closed, or socket type wrenches for ease in attaching the pickup to the engine frame.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a diagram of a jet engine installation, embodying the invention;

Fig. 2 is an enlarged section of a pick-up device which forms part of the invention; and Fig. 3 is a wiring diagram of a portion of the engine analyzer system.

In Fig. 1 a jet engine 1 is indicated. It is shown as provided with any desired number of separate pick-up devices 2, responding to vibrations at critical places upon the engine structure. For example, these devices 2 may be located adjacent bearings or the like, the vibrations of which are likely to result in dangerous conditions.

One of the pick-up devices 2 is indicated in Fig. 2. This pick-up device is shown as having a housing 3 made of non-magnetic hexagonal material such as brass (preferably nickel or chronium plated), and provided with an integral threaded extension 4. A circular flange 6 is located between the main body of housing 3 and extension 4. The pick-up device 2 is placed into intimate contact with the jet engine 1, as by screwing the extension 4 tightly into a threaded aperture 5 of the engine 1.

The housing 3 is formed of standard hex stock whereby it can be used for the accommodation of a wrench for the purpose of installation.

The upper end of the housing 3 is provided with a threaded portion 7, adapted to be engaged by a hexagonal coupling nut 8, which also engages the cap or cover 9 of a cable connector, utilized in a manner to be hereinafter described.

Suspended within, and supported by the housing is a modulator 10 made of magnetic material which responds in a magneto-strictive manner, to variations in mechanical stress upon said modulator. The modulator 10 is made quite slender, so that its permeability is easily varied in response to vibratory extension and constriction. Since this phenomenon is now well-known, further description thereof is unnecessary.

The modulator 10 serves as a core for pick-up coil 11 of a moderate number of turns, such as 2000. Generated in this pick-up coil are impulses corresponding to the variations of magnetic flux, due to variations in the permeabilty of the modulator 10.

To serve as a seismic mass and also to produce an initial magnetism through the modulator 10, use is made of a permanent magnet 12 of cylindrical form and of relatively massive proportions. This permanent magnet is preferably made of Alnico, and is located within the cylindrical bore 13 of the housing 3. Its upper end is silver welded to the lower end of the modulator 10. Its lower end is quite appreciably spaced above the disc in the bottom of bore 13. This disc is made of good insulation such as Teflon, to withstand relatively high temperatures, and serves primarily for electrical insulation between the magnet 12 and the base of the cylindrical bore 13.

The initial magnetization produced by magnet 12 is such as to provide maximum permeability changes.

Furthermore, the coil 11 is confined between two Teflon washers 15 and 16. Washer 15 is disposed above the permanent magnet member 12. Washer 16 is disposed between the upper end of coil 11 and the disc 17 of magnetic material, which is silver soldered or welded to the upper end of modulator 10.

For suspending and supporting the modulator 10, as well as permanent magnet 12 at the top portion of the housing 3, use is made of a collar 18 having a central cup member 19. The outer edge of the collar 18 is silver soldered to the inner surface of the housing 3, and hermetically seals it. The cup member 19 accommodates a glass bead 20 serving to insulate the collar 18 from the modulator 10.

In order further electrically to isolate the parts, a tube 21 of insulation material such as Teflon, is telescoped within the housing 3, and serves as a liner therefor.

One terminal of the pick-up coil 11 is grounded to the collar 18, as indicated at 22. It is thus grounded. The other terminal 23 is connected as by silver solder to the magnetostrictive structure, which in turn is in electrical connection with an insulated cable 24. This cable 24 passes into a conducting bushing 25 permanently attached to the inside of a porcelain connector body 26. The bushing 25 is in electrical contact with a spring 27 extending downwardly from body 26, to make a connection with a brass collar 28 threaded onto the threaded upper end of the modulator 10. The complete circuit for the coil 11 includes grounded connection 22, coil 11, connection 23, magnet 12, modulator 10, collar 28, spring 27, cable 24, to other parts of the system which ultimately reach ground.

The cover 9 for housing 3 is appropriately apertured to permit passage of the cable 24. Furthermore, the nut 8 serves to hold the cover 9 in place, which in turn urges the porcelain body 26 downwardly against the compression force of spring 27, into contact with collar 28.

The active components of the magnetostrictive pick-up device as heretofore stated, are hermetically sealed within the housing 3. Since this housing 3 is non-magnetic, the return path for the magnetic flux created through the modulator 10 is through non-magnetic media. This lack of paramagnetic return path is important for the following reasons:

(1) By using a return path in air, the permeability of the return path is not a function of temperature, since the permeability of air is independent of temperature.

(2) By allowing the seismic mass to have perfect freedom of movement with a return path in air, there is no significant contribution to electrical behavior caused by modulation of the air gap distance, whereas in a device where critical air gaps are required, the reluctance variation due to the changing air gap could well swamp out the magnetostrictive effect.

The welding of the elements of the pick-up 2 inside of the housing 3 is important because of the very small displacements experienced by the seismic mass, since welding is the only way of assuring that physical contact where required is rigid enough, so that the microscopic motion is entirely confined to the modulator and seismic mass, and is not shunted or coupled in series with a mechanical path of less rigidity, which would rob the device of its sensitivity.

The vibrations transmitted to the housing 3 by virtue of its intimate contact with the jet engine frame 1 are caused to produce corresponding vibrations in a longitudinal direction, because of the provision of the seismic mass of the permanent magnet 12. This mass has sufficient inertia so that the modulator 10 is subjected to vibrations corresponding to those imparted to housing 3. Furthermore, vibrations in a lateral direction have no appreciable effect upon the intensity of the magnetization through the modulator 10.

The entire structure may be quite small and of light weight. Furthermore, by appropriate proportioning of the parts, the natural frequency of the vibrating structure is low and close to the band of frequencies of the vibrations produced by the operation of the jet engine 1. This contributes to the high output of the pickup, rendering it unnecessary to provide amplification. A further contributing factor is the provision of the massive permanent magnet 12 cooperating with a slender modulator. Furthermore, hermetic sealing of the parts within the housing 3 insures against deterioration. The conductors enclosed in the housing are preferably vacuum impregnated. Coil 11 is made of superior temperature resistant wire.

Each of the pick-up devices 2, as indicated in Fig. 1, can be connected by its own cable 24 to a pick-up selector switch 29. This selector switch optionally can connect any one of the pick-up devices 2 to an attenuator or nulling circuit device 30. This, in turn, may pass a signal to an electron ray tube 31, a cathode ray oscilloscope, or any other suitable indicator. The specific connections are indicated in Fig. 3.

The attenuator or nulling circuit 30 and the electron ray tube 31 are shown to best advantage in Fig. 3. The grid 36 of the amplifier portion of the tube 31 controls this tube in a manner to be hereinafter described. The direct potential difference between this grid and the cathode 38 is zero by virtue of the blocking capacitor 45 and resistor 35.

The input signal impulses from any one of the optionally chosen pick-ups 2 are connected by a conductor 32 to the arm 33 of a double-pole double-throw switch. These impulses, in the form of relatively low audio-frequency current, pass a rectifier 34 and are then impressed on grid 36 by virtue of lead 44, the capacitance 45 and resistance 35 in combination.

Lead 44 has impressed upon it a positive direct potential by the aid of a potentiometer resistance 39 in series with a source of direct current 42, such as a battery; and a tap 40 connected to lead 44 through an isolating resistance 43. The other arm 41 of the double-pole double-throw switch and ground connections 50 and 51 render this circuit effective.

Electron ray tube indicator 31 includes the usual circular or conical anode 37 connected to a source of positive potential. The cathode 38 for the indicator is opposite the center of anode 37. When the grid 36 is rendered negative with respect to the cathode 38, due to the signal impulses, the non-luminous sector between the cathode 38 and the anode 37 decreases in angle. The maximum angle is a quadrant and occurs in the absence of signal impulses.

By virtue of the rectifier structure 34, the resistance 43, and the position of the tap 40 on potentiometer 39, only that amount of the input signal which exceeds in value the direct potential existing on lead 44 is rectified, thence to actuate grid 36.

By appropriate adjustment of the tap 40 along the potentiometer resistance 39 the potential of lead 44 is set to a positive direct voltage which corresponds to the maximum permissible peak vibrations encountered by pick-up 2; under such circumstances, a quadrant of anode 37 remains dark. An increase in vibrations over the permissible value causes a corresponding decrease in the angle of the dark sector. By adjustment of the tap 40 of potentiometer 39 upwards, a point will be reached where the angle of the dark sector will be restored to 90°. By using a calibrated dial to measure the position of the tap 40, the amount of vibration present can be read directly.

The inventor claims:

1. In a vibration sensitive device: a core member made of magnetic material; a permanent magnet of much greater mass attached to one end of said core member; a pick-up coil surrounding said core member; and means supporting the core member and magnet adjacent the other end of the core member; the permanent magnet being otherwise unattached.

2. In a vibration sensitive device: a core member made of magnetic material; a permanent magnet of much greater mass attached to one end of said core member; a pick-up coil surrounding said core member; a housing of non-magnetic material; and means supporting the core member and the magnet from one end of the housing, the magnet being otherwise free of the housing.

3. In a vibration sensitive device: an elongated core member made of magnetic material, and serving as a magnetostrictive modulator; a permanent magnet attached to one end of the core member; a pick-up coil surrounding said core member; and means supporting said core member adjacent the other end thereof.

4. In a vibration sensitive device: an elongated core member made of magnetic material, and serving as a magneto-strictive modulator; a permanent magnet attached to one end of the core member; a pick-up coil surrounding said core member; a non-magnetic housing for the core member and magnet; and means joining the other end of the core member to one end of the housing for supporting the core member and magnet, and so that the magnet is otherwise free of the housing.

5. In a vibration sensitive device: a core member made of magnetic material; a permanent magnet of much greater mass attached to one end of said core member; a pick-up coil surrounding said core member; a housing of non-magnetic material; means supporting the core member and the magnet from one end of the housing, the magnet being otherwise free of the housing; and means hermetically sealing said housing.

6. In a vibration sensitive device: an elongated core member made of magnetic material, and serving as a magneto-strictive modulator; a permanent magnet attached to one end of the core member; a pick-up coil surrounding said core member; a non-magnetic housing for the core member and magnet; means joining the other end of the core member to one end of the housing for supporting the core member and magnet, and so that the magnet is otherwise free of the housing; and means hermetically sealing said housing.

7. In a vibration sensitive device: an elongated core member made of magnetic material, and serving as a magneto-strictive modulator; a permanent magnet attached to one end of the core member; a pick-up coil surrounding said core member; a housing of non-magnetic material for the modulator, the magnet and the coil; a collar adjacent the other end of the modulator; means for insulatingly supporting said collar on said modulator; the outer edge of the collar being sealed to the interior wall of the housing for supporting the assembly of the modulator, magnet, and coil; said magnet being otherwise free; and electrical connection means for the coil mounted on said other end of the modulator.

References Cited in the file of this patent

UNITED STATES PATENTS

| | | |
|---|---|---|
| 2,023,244 | Schnaitter | Dec. 3, 1935 |
| 2,359,245 | Ritzmann | Sept. 26, 1944 |
| 2,435,031 | Burns | Jan. 27, 1948 |
| 2,445,318 | Eldredge et al. | July 20, 1948 |